United States Patent
Zhou

(10) Patent No.: US 8,513,988 B2
(45) Date of Patent: Aug. 20, 2013

(54) ADAPTOR CIRCUIT FOR POWER SUPPLY

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 297 days.

(21) Appl. No.: 13/163,699

(22) Filed: Jun. 19, 2011

(65) Prior Publication Data
US 2012/0268175 A1    Oct. 25, 2012

(30) Foreign Application Priority Data
Apr. 19, 2011    (CN) .......................... 2011 1 0097294

(51) Int. Cl.
*H03L 7/00*    (2006.01)
(52) U.S. Cl.
USPC .......................................................... 327/142

(58) Field of Classification Search
None
See application file for complete search history.

(56) References Cited

U.S. PATENT DOCUMENTS
2007/0268048 A1*    11/2007    Komatsu et al. .............. 327/143

* cited by examiner

*Primary Examiner* — Daniel Rojas
(74) *Attorney, Agent, or Firm* — Altis Law Group, Inc.

(57) ABSTRACT

A adaptor circuit for a power supply includes a first comparison circuit, a timing circuit; and a second comparison circuit. An input of the first comparison circuit is electrically connected to a PS_ON terminal. The first comparison circuit includes a diode. An input of the second comparison circuit is electrically connected to the diode of the first comparison circuit via the timing circuit. When the PS_ON signal is powered on, the diode is off, and the timing circuit charges up in a predetermined time, and the second comparison circuit outputs a PWR_GOOD signal after the predetermined time. When the PS_ON signal is powered off, the diode turns on, and the timing circuit discharges, so the second comparison circuit stops outputting a PWR_GOOD signal.

9 Claims, 3 Drawing Sheets

ADAPTOR CIRCUIT FOR POWER SUPPLY

BACKGROUND

1. Technical Field

The present disclosure relates to adaptor circuits for power supplies and, more particularly to an adaptor circuit for a power supply of a motherboard of a computer.

2. Description of Related Art

Most computer motherboard is driven by an advanced technology extended (ATX) power supply. The ATX power supply provides +3.3V, +/−5V, +/−12V, +5V_SB (stand by), a PS_ON (power supply on) signal, and a PWR_GOOD (power good) signal. However, the PWR_GOOD signal outputted by the ATX power supply usually includes dithering signals; therefore, it affects the time order of the main board.

Therefore, there is room for improvement in the art.

DETAILED DESCRIPTION

Figure 1:
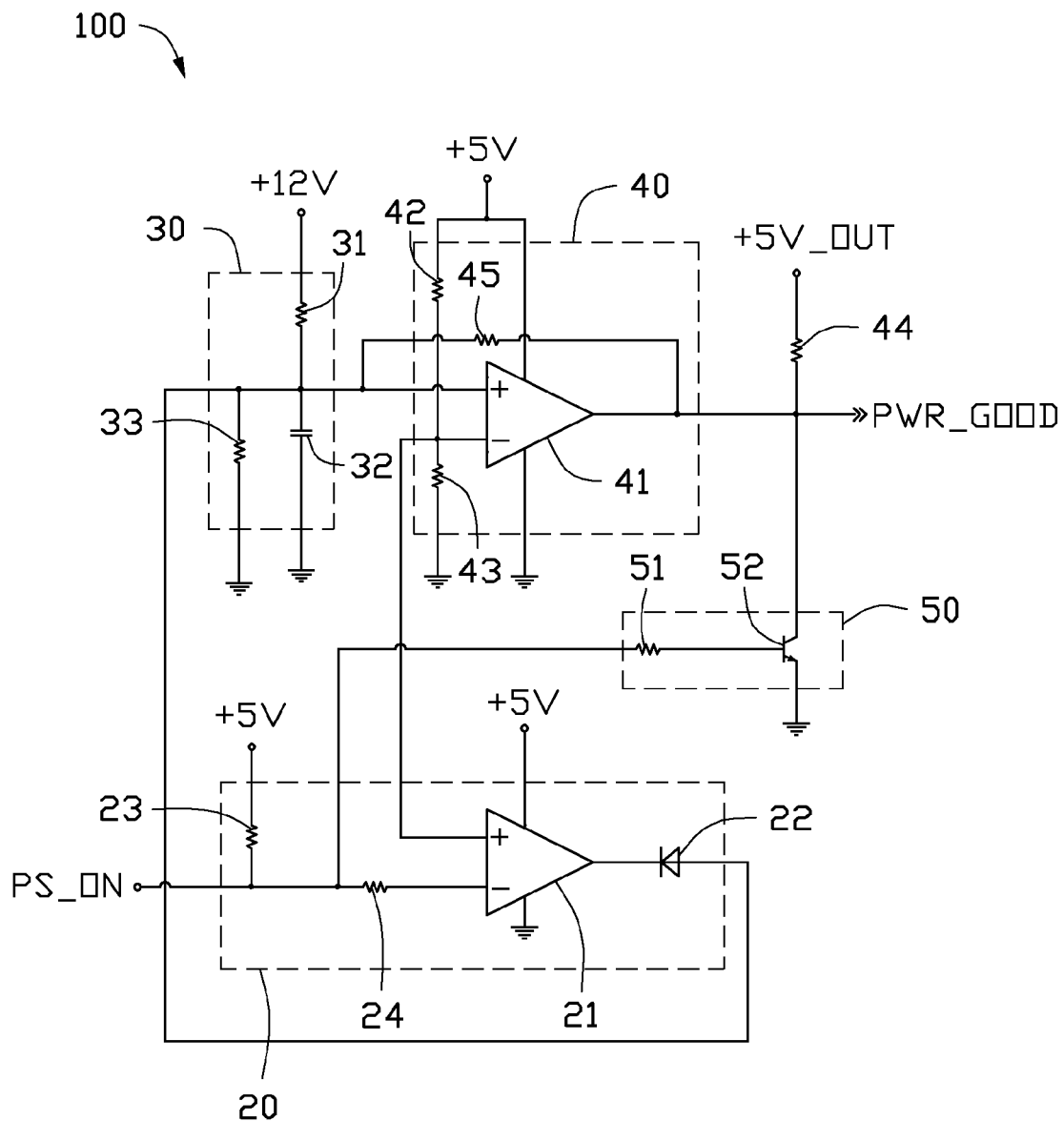
FIG. 1 is circuit diagram of an adaptor circuit for a power supply, in accordance with an exemplary embodiment of the present disclosure.

Referring to FIG. 1, an exemplary embodiment of an adaptor circuit 100 for a power supply is shown. In the present embodiment, the adaptor circuit 100 includes a first comparison circuit 20, a timing circuit 30, a second comparison circuit 40, and a discharge circuit 50.

The first comparison circuit 20 includes a first comparator 21, a diode 22, a first resistor 23, and a current limiting resistor 24. In the present embodiment, a power terminal of the first comparator 21 is electrically connected to a first voltage output terminal of a power supply such as an ATX power supply, which is about 5 volt (V), and the ground terminal of the first comparator 21 connects to ground. An inverting terminal of the first comparator 21 is electrically connected to the first voltage output terminal of the power supply via the first resistor 23 and the current limiting resistor 24. An inverting terminal of the first comparator 21 is electrically connected to the PS_ON terminal via the current limiting resistor 24. An output of the first comparator 21 is electrically connected to a cathode of the diode 22. In the present embodiment, the first resistor 23 is a pull-up resistor.

The timing circuit 30 is connected to the anode of the diode 22. The timing circuit 30 includes a timing resistor 31, a timing capacitor 32 and a divider resistor 33. A first end of the timing resistor 31 is electrically connected to a second voltage output terminal of the power supply, which is about 12 volts (V), and the second end of the timing resistor 31 is connected to one terminal of the timing capacitor 32 and the anode of the diode 22, and the other terminal of the timing capacitor 32 is connected to ground. The divider resistor 33 is connected in parallel to the timing capacitor 32. In the present embodiment, the timing resistor 31 and the timing capacitor 32 cooperatively determine the delay time of a PWR_GOOD signal.

An input of the second comparison circuit 40 is electrically connected to the diode 22 of the first comparison circuit 40 via the timing circuit 30. In the present embodiment, the second comparison circuit 40 includes a second comparator 41, a second resistor 42 and a third resistor 43. A non-inverting terminal of the second comparator 41 is electrically connected to the anode of the diode 22. An inverting terminal of the second comparator 41 is electrically connected to the first voltage output terminal of the power supply via the second resistor 42, and is connected to ground via the third resistor 43, and is connected to the non-inverting terminal of the first comparator 21. A power terminal output of the second comparator 41 is electrically connected to the first voltage output terminal of the power supply, and a ground terminal thereof is connected to ground. An output of the second comparator 41 is electrically connected to the first voltage output terminal of the power supply via a pull-up resistor 44, and the output of the second comparator 41 is electrically connected to the non-inverting terminal thereof via a feedback resistor 45.

The discharge circuit 50 includes a discharge resistor 51 and an NPN-type transistor 52. One terminal of the discharge resistor 51 is electrically connected to the inverting terminal of the first comparator 21 via the current limiting resistor 24, and the other terminal of the discharge resistor 51 is electrically connected to the base of the NPN-type transistor 52. The collector of the NPN-type transistor 52 is electrically connected to the output of the second comparator 41.

At start up of the power adaptor 100, by feeding the first voltage output terminal of the power supply and the second voltage output terminal, the PS_ON signal is powered on and is low level, and the first comparator 21 outputs a low level signal; therefore the diode 22 turns off. The timing capacitor 32 charges up. The voltage of the non-inverting terminal of the second comparator 41 is lower than that of the inverting terminal, therefore the second comparator 41 outputs a low level signal, and a PWR_GOOD signal is not outputted.

Figure 2:
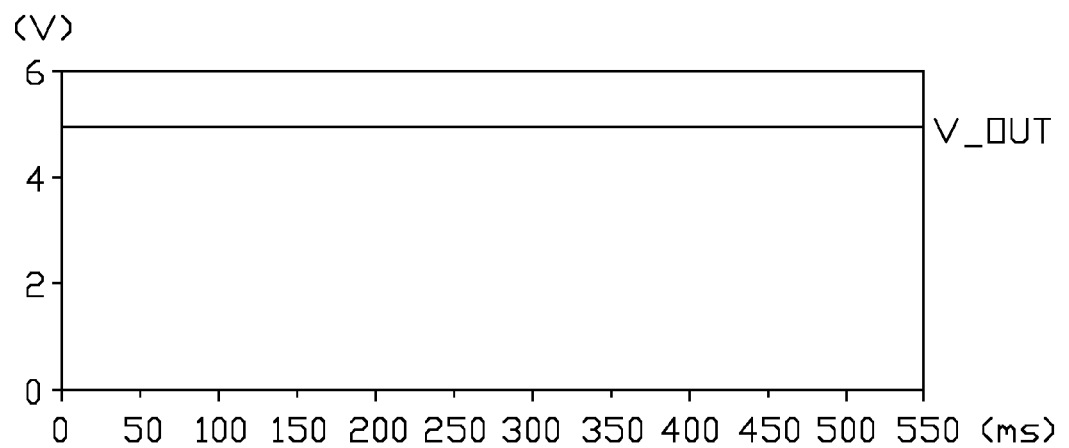
FIG. 2 is a schematic sequence waveform diagram of a PWR_GOOD signal taken at a first voltage output terminal of a power supply of FIG. 1.
Figure 2:
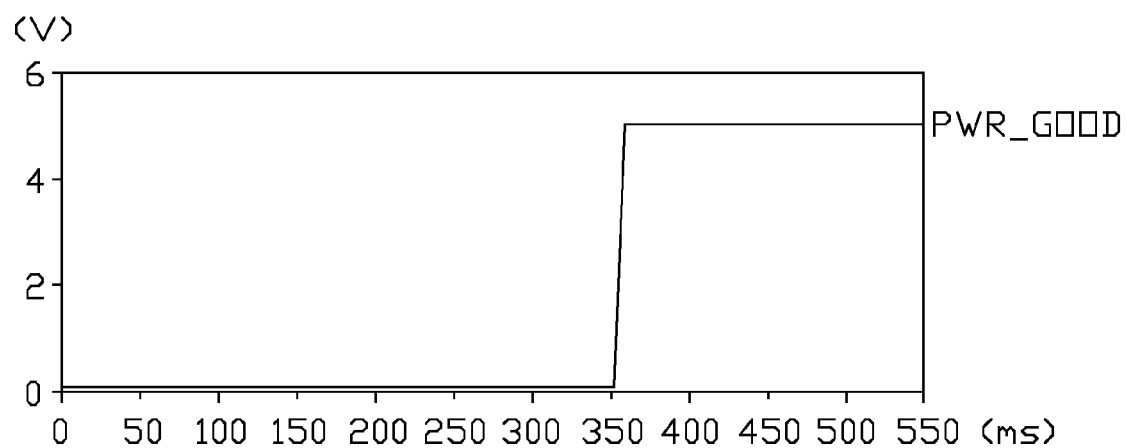

When the voltage of the non-inverting terminal of the second comparator 41 is substantially equal to that of the inverting terminal, the second comparator 41 outputs a high level signal, in other words, the PWR_GOOD signal is at a high level and the power supply is properly set. The delay imposed on the PWR_GOOD signal is substantially equal to the charging time of the timing capacitor 32. Referring to FIG. 2, in the present embodiment, the delay time imposed on the PWR_GOOD signal is 353 milliseconds.

Figure 3:
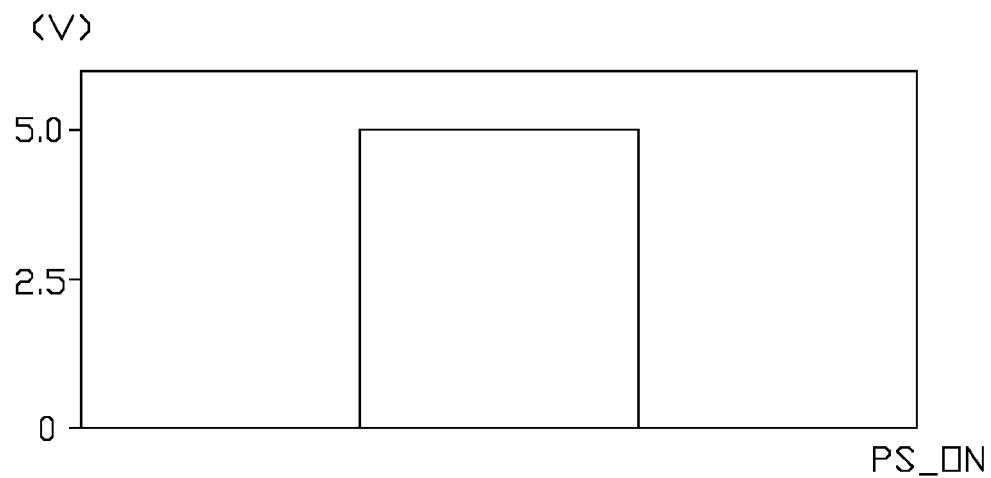
FIG. 3 is a schematic sequence waveform diagram of a PWR_GOOD signal taken at the PS_ON output of FIG. 1.
Figure 3:
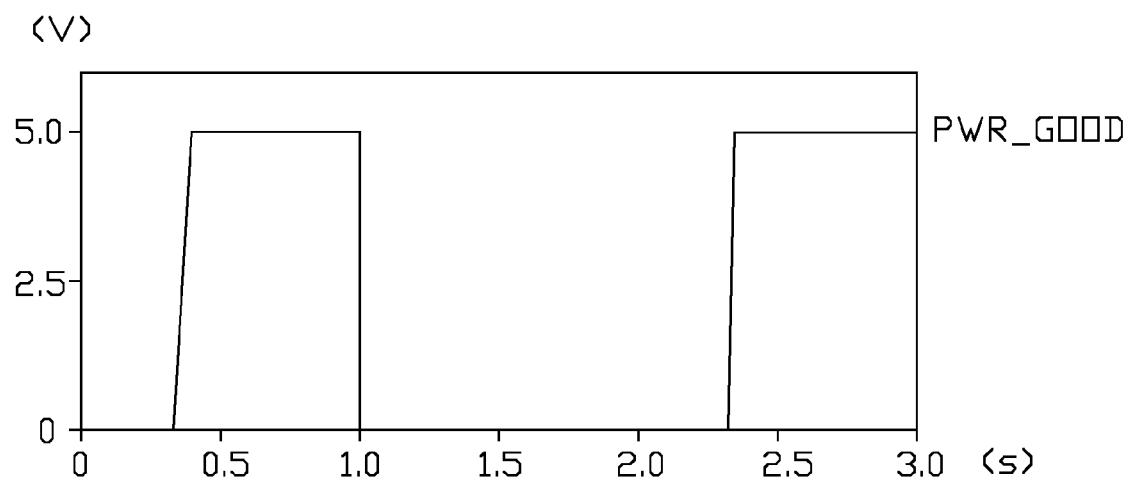

When the power adaptor 100 is turned off, the first voltage output terminal of the power supply and the second voltage output terminal of the power supply are at zero, the diode 22 turns on, and the timing capacitor 32 discharges via the diode 22; therefore the second comparator 41 outputs a low level signal. In the present embodiment, when the power adaptor 100 is turned off, the NPN-type transistor 52 turns on and it can rapidly discharge; therefore, the production of dithering signals is avoided. Referring to FIG. 3, there are no dithering signals when the power adaptor 100 is turned off.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An adaptor circuit for a power supply generating a PS_ON signal, the adaptor circuit comprising:

a first comparison circuit, an input of the first comparison circuit being adapted for electrically connecting the PS_ON signal, the first comparison circuit comprising a diode;

a timing circuit; and a second comparison circuit, an input of the second comparison circuit being electrically connected to the diode of the first comparison circuit via the timing circuit, when the PS_ON signal being powered on, the diode is off, and the timing circuit charges up in a predetermined time, and the second comparison circuit outputting a PWR_GOOD signal after the predetermined time to indicate the power supply being properly set; when the PS_ON signal being powered off, the diode turns on, the timing circuit discharges, and the second comparison circuit stop outputting the PWR_GOOD signal.

2. The adaptor circuit of claim 1, wherein the first comparison circuit comprises a first comparator, an inverting terminal of the first comparator being connected to the PS_ON signal and a first voltage output terminal of a power supply, an output terminal of the first comparator being connected to the cathode of the diode, a power terminal of the first comparator being electrically connected to a first voltage output terminal of the power supply.

3. The adaptor circuit of claim 2, wherein the timing circuit comprises a timing resistor and a timing capacitor, one end of the timing resistor being connected to a second voltage output terminal of the power supply, and the other end of the timing resistor being connected to one terminal of the capacitor, and the other terminal of the capacitor being connected to ground.

4. The adaptor circuit of claim 3, wherein the second comparison circuit comprises a second comparator, a second resistor and a third resistor, a non-inverting terminal of the second comparator being connected to the anode of the diode and the other end of the timing resistor, the inverting terminal of the second comparator being connected to the first voltage output terminal of the power supply via the second resistor, and being connected to ground via the third resistor, the second comparator outputting the PWR_GOOD signal.

5. The adaptor circuit of claim 4, further comprising a discharge circuit, two terminals being respectively connected to the inverting terminal of the first comparator and the output terminal of the second comparator.

6. The adaptor circuit of claim 5, wherein the discharge circuit comprises a discharge resistor and an NPN-type transistor, two terminals of the discharge resistor being respectively connected to the inverting terminal of the first comparator and a base of the NPN-type transistor, a collector of the NPN-type transistor being connected to the output of the second comparator.

7. The adaptor circuit of claim 4, further comprising a pull-up resistor electrically connected between the output of the second comparator and the first voltage output terminal of the power supply.

8. The adaptor circuit of claim 4, wherein the output of the second comparator is connected to the non-inverting terminal of the second comparator.

9. The adaptor circuit of claim 3, wherein the timing capacitor is parallel connected to a divider resistor.

* * * * *